(No Model.) 4 Sheets—Sheet 2.
P. HIEN.
CORN PLANTER AND DRILL.
No. 247,913. Patented Oct. 4, 1881.

WITNESSES:
Harry Drury
James F. Tobin

INVENTOR:
Phillip Hien
by his attorneys
Howson and Son

N. PETERS. Photo-Lithographer. Washington, D. C.

(No Model.) 4 Sheets—Sheet 3.

P. HIEN.
CORN PLANTER AND DRILL.

No. 247,913. Patented Oct. 4, 1881.

WITNESSES:
Harry Drury.
James F. Tobin.

INVENTOR:
Phillip Hien
by his attorneys.
Howson and Sons (No Model.) 4 Sheets—Sheet 4.

P. HIEN.
CORN PLANTER AND DRILL.

No. 247,913. Patented Oct. 4, 1881.

WITNESSES:
Harry Drury
James F. Tobin

INVENTOR:
Phillip Hien
by his attorneys
Howson and Son

UNITED STATES PATENT OFFICE.

PHILLIP HIEN, OF ROCK ISLAND, ILLINOIS.

CORN PLANTER AND DRILL.

SPECIFICATION forming part of Letters Patent No. 247,913, dated October 4, 1881.

Application filed July 20, 1881. (No model.)

*To all whom it may concern:*

Be it known that I, PHILLIP HIEN, a citizen of the United States, residing in Rock Island, Illinois, have invented certain Improvements in Corn Planters and Drills, of which the following is a specification.

My invention relates to certain improvements in that class of corn-planters in which a single grain of corn at a time is delivered through the grain-spout by means of a rotating dropping-plate having openings which are brought in succession over the mouth of said grain-spout, the object of my improvements being to provide simple, compact, and effective means for operating the dropping-plate, and for covering the corn and pressing the earth upon the same.

Figure 1:
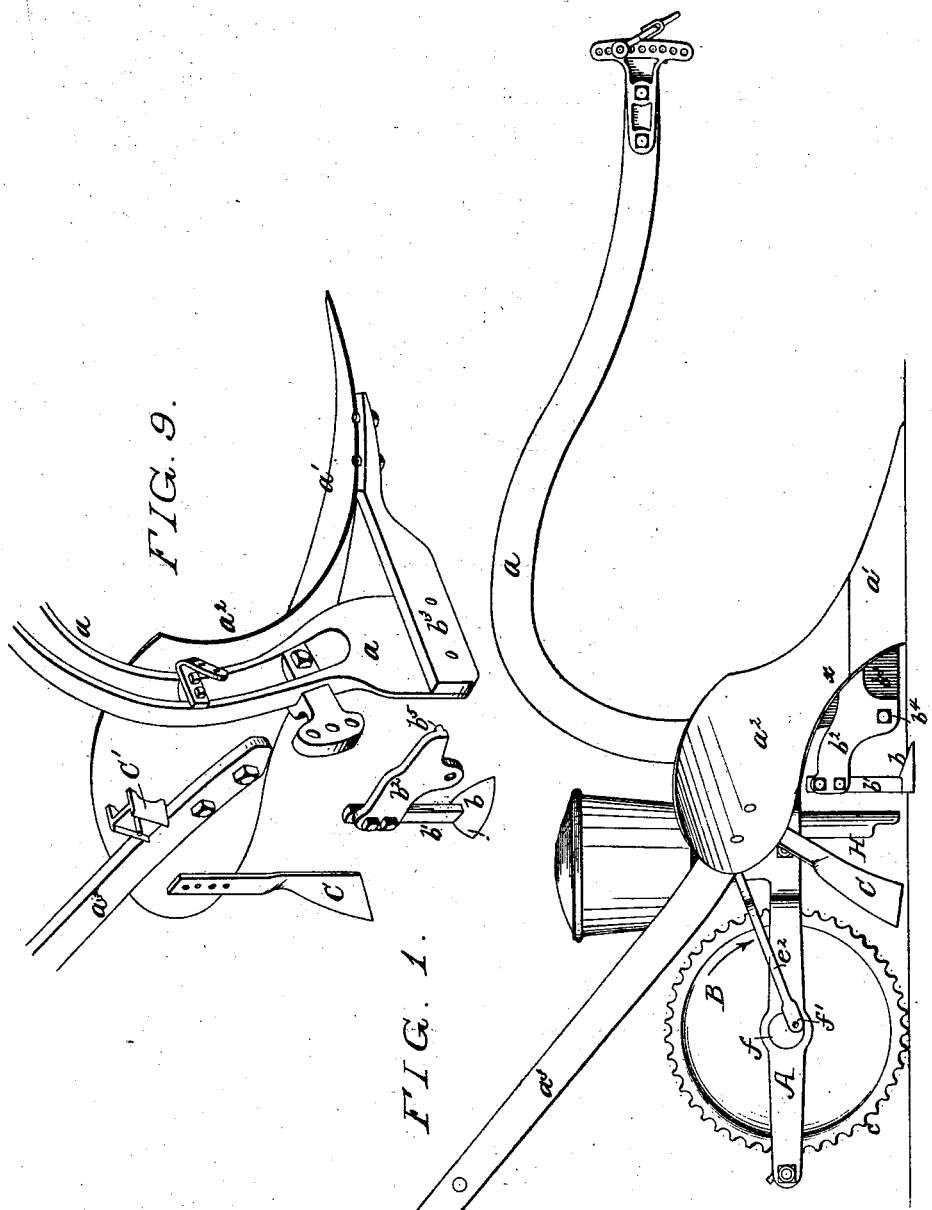
Figure 2:
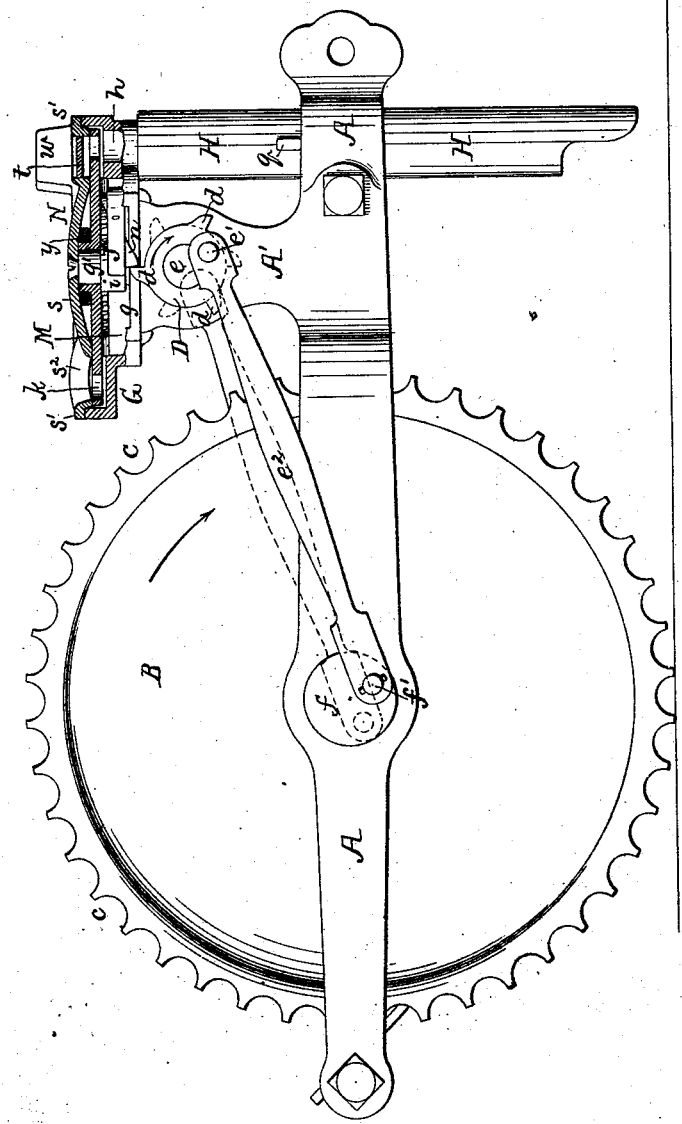
Figure 8:
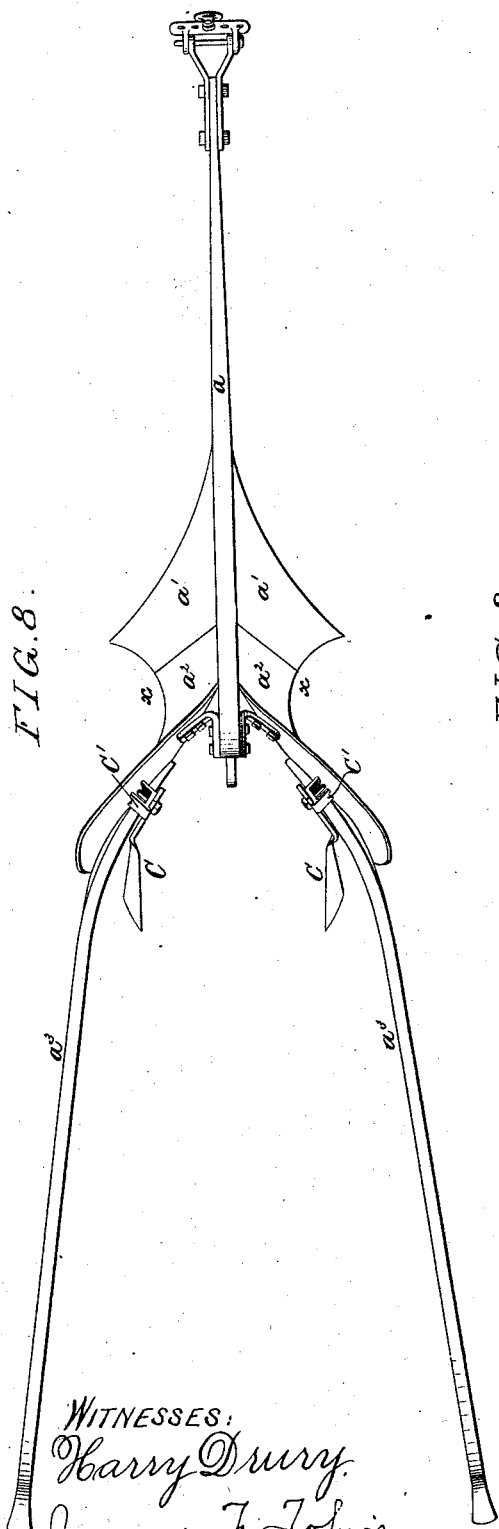
Figure 3:
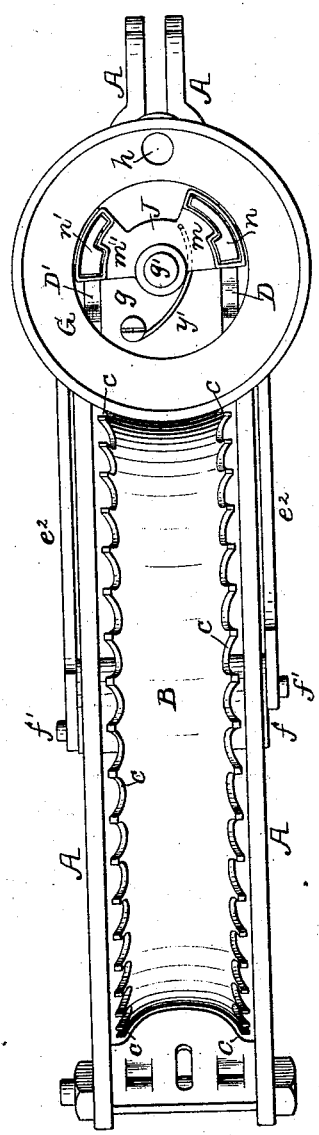
Figure 5:
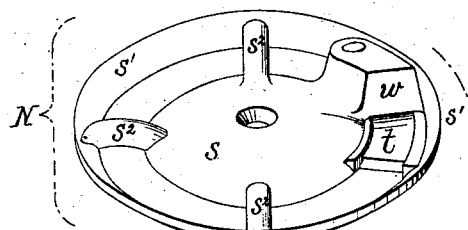
Figure 4:
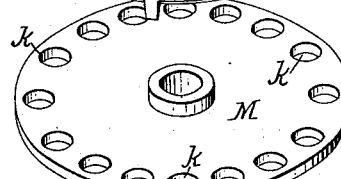
Figure 7:
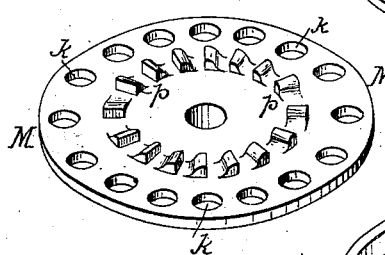
Figure 6:
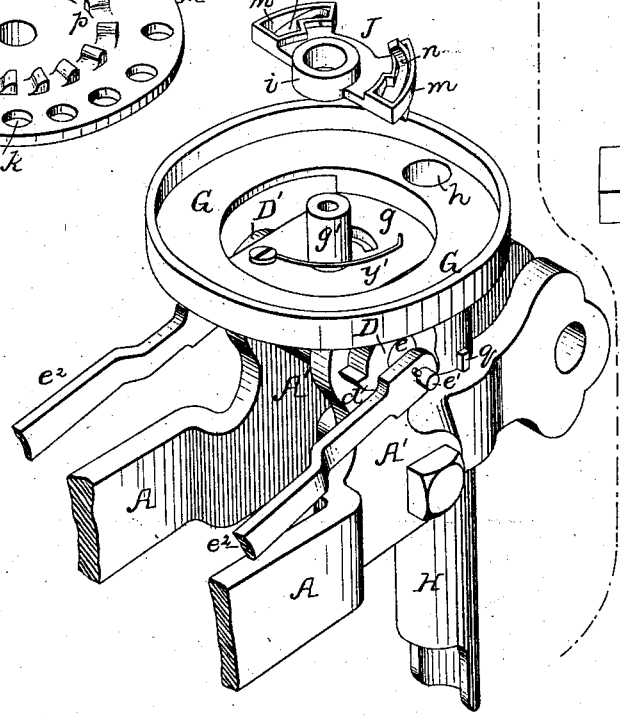

In the accompanying drawings, Figure 1, Sheet 1, is a side view of my improved corn-planter; Fig. 2, Sheet 2, a side view, partly in section, of the planting device separated from the plow; Fig. 3, Sheet 3, a plan view of Fig. 2, with the hopper, dropping-plate, and cover-plate removed; Fig. 4, Sheet 4, a perspective view of the planting device, showing the various parts detached; Fig. 5, an inverted perspective view of the dropping-plate; Fig. 6, an enlarged sectional view of the spring cut-off and its casing; Fig. 7, an enlarged perspective view of one of the pawls for actuating the dropping-plate; Fig. 8, Sheet 3, a plan view of the furrowing-plow; and Fig. 9, Sheet 1, a perspective view, showing the method of attaching the subsoil-plow and coverers to the frame.

The furrowing-plow, as shown in Fig. 1, is constructed as usual, having the beam $a$, share $a'$, mold-board $a^2$, and handles $a^3$; but although this form of plow has been selected for illustrating my invention, it should be understood that the latter can be applied with equal advantage to sulky-plows. The furrowing-plow is double, as shown in Fig. 8, and the share and mold-board are cut away on each side, as seen at $x$, for a purpose described hereinafter.

The subsoil-plow $b$ has a shank, $b'$, which is bolted to the rear end of a plate, $b^2$, the latter being secured to a rearwardly-projecting bar, $b^3$, which is located centrally between, and is secured to, the plows, this bar being generally termed the "landside." The bolt $b^4$, which secures the plate $b^2$, is one of the bolts whereby the beam is secured to the landside; and in order to prevent the twisting of the plate $b^2$, which would otherwise occur, owing to this single bolt-fastening, the rear of said plate has a shoulder, $b^5$, Fig. 9, which bears upon the upper edge of the landside $b^3$, and firmly retains the plate in position thereon.

To a projection on the rear of the beam $a$ are hung a pair of bars, A, which have bearings for the axle $f$ of a wheel, B, the latter being free to turn in its bearings and resting on the earth, so that as it trails in the rear of the plow it serves as a traction-wheel for actuating the corn-planting devices. In order to increase the traction of the wheel the periphery of the same is made concave, as shown in Fig. 3, and the opposite flanges, $c\ c$, thus formed are toothed or notched, the notched flanges and concave periphery of the wheel also rendering the latter of value as a means of pulverizing and pressing onto the corn the loose earth which has been thrown over the same by the coverers C. These coverers C are secured to the frame in the manner shown in Fig. 9. The shank of each coverer is arranged on the inside of the handle $a^3$, and between said shank and the rear face of the mold-board, at a point above the handle, is a filling-block, C', through which and through the mold-board and coverer-shank passes the securing-bolt. By this means the weakening of the handle by forming an extra bolt-hole therein is prevented, yet the coverer is firmly held in position, as the filling-block bears upon the upper edge of the handle, and is prevented from twisting thereby.

The devices whereby one grain of corn at a time is delivered at regular intervals into the furrow are shown in Sheets 2 and 3 of the drawings, and will now be described.

The bars A have at the front ends vertical standards A', through which passes a transverse shaft, $e$, having at one end a tappet-wheel, D, and at the other end a similar wheel, D', each tappet-wheel having a crank-pin, $e'$, connected by a suitable rod, $e^2$, to a crank-pin, $f'$, on the axle of the traction-wheel B, so that as the latter rotates in the direction of the arrow, Fig. 2, a similar rotating motion will be imparted to the tappet-wheels D D', the crank-pin of the wheel D being set at a right angle to that of the wheel D', in order to prevent jamming or irregular movement of said wheels when the crank-pins are passing the center.

To the upper ends of the standards A' is secured the cross-bar $g$ of a flanged annular plate, G, an opening, $h$, in said plate communicating with the grain-spout H, which projects downward directly in the rear of the subsoil-plow $b$, and terminates in the furrow formed by said plow. The grain-spout H is fitted between the bars A, and is held in position vertically by the plate G, and by lugs $q$ on the sides of the spout, the lugs resting on the upper edges of the bars A, and the plate G resting on the top of the spout, so that upon removing said plate G the spout can be readily lifted out. The cross-bar $g$ of the plate G has a central vertical stem, $g'$, to which is adapted the hub $i$ of a frame, J, said frame having two arms, $m$ $m'$, in the outer end of each of which is formed a slot for the reception of a pivoted pawl. The pawl $n$ of the arm $m$ is double—that is to say, it has a projection on the lower edge for being acted upon by the tappets $d$ of the wheel D, and a projection on the upper edge for acting upon an annular rack, $p$, formed on the under side of the dropping-plate M, Fig. 5, which rests upon the annular plate G, and has a central hub adapted to the stem $g'$. The pawl $n'$ of the arm $m'$ is single, and is acted upon by the tappets of the wheel D', so that as the wheels D D' are rotated a vibrating movement will be imparted to the frame J.

In the dropper-plate M are formed the usual openings, $k$, each adapted for the reception of a single grain of corn, these openings bearing such relation to the teeth of the rack $p$ that as the plate is intermittently actuated by the pawl $n$ the openings will be brought in succession over the opening $h$, and the grains of corn will be discharged into the furrow through the spout H.

Secured to the upper end of the stem $g'$ is the cover-plate N, which comprises the central disk, $s$, and outer ring, $s'$, connected by bridge-pieces $s^2$, so that free access of the corn to the openings of the dropper-plate M is permitted, without causing the corn to accumulate in a heap in advance of the cut-off plate $t$, the latter occupying a position in advance of the opening $h$, and being held in contact with the upper surface of the dropping-plate by the action of a spring, $t^2$, upon the elevated rear end, $t'$, of the plate $t$, said elevated rear end of the plate occupying a position in the hood $w$, which is cast on the cover-plate N, the retention of the plate $t$ $t'$ and spring $t^2$ in the hood $w$ being effected by the base-plate $v$, which is held in place by a central bolt. (See Fig. 6.)

As the machine is drawn forward the plow and subsoiler turn a furrow, into which the corn is dropped at regular intervals from the spout H, the loose friable earth which passes through the recessed portion $x$ of the main plow being thrown over the corn by the coverers C, and being pulverized and pressed down upon the same by the concave periphery of the wheel D, there being no tendency of the toothed flanges $c$ to break up the ridge of earth or tear the corn from the same, owing to the fact that said flanges of the wheel D travel on each side of the ridge and exercise no disturbing influence on the latter. The sod or surface growth, with its roots and seeds, is thrown outward by the wings of the mold-boards beyond the influence of the coverers C, the latter merely acting upon the loose earth.

The operation of the devices whereby the grains of corn are delivered to the grain-spout is as follows: The tappet-wheels D D' being continuously rotated, one of the tappets $d$ of the wheel D commences to act upon the lower projecting end of the pawl $n$ when the upper end of the same engages with one of the teeth of the rack $p$ on the dropper-plate M. The frame J is vibrated by the action of the tappet $d$ on the pawl $n$, and a forward movement is imparted to the dropper-plate M, this movement continuing until one of the openings $k$ is caused to coincide with the opening $h$, and the grain of corn is discharged through the spout H. As the pawl $n$ moves in the arc of a circle coinciding with the annular rack $p$, said pawl must exert a positive and unvarying action upon the tooth throughout its entire movement, thus overcoming an objection to that class of planters in which the pawls are carried by sliding frames, there being in this case more or less lateral movement of the pawl on the faces of the teeth, due to the fact that the direction of movement of the pawl is not coincident with that of the rack.

In order to prevent an undue forward movement of the plate M—such as would result in carrying the openings $k$ past the opening $h$, or cause irregularity in the action of the pawl $n$ upon the teeth of the rack $p$—I retard the movement of the plate by interposing between the same and the cover-plate N a frictional retainer, $y$, preferably made in the form of a washer surrounding the hub of the plate N, the washer being composed of rubber, leather, cork, or other elastic or semi-elastic material, or being made in the form of a coiled or elliptic spring of sufficient tension to prevent any movement of the plate after the latter is released from the control of the pawl $n$, yet not sufficient to prevent the free movement of the plate by the said pawl. After acting on one tooth of the rack $p$ the pawl $n$ is released from the control of the tappet of the wheel D, and is returned to position for engaging with the next tooth by the action upon the pawl $n'$ of a tappet, $d$, of the other wheel, D', a spring, $y'$, serving to maintain the pawl $n$ in contact with the tooth, after its engagement therewith, until the lower end of the pawl is again acted upon by one of the tappets $d$ of the wheel D.

Instead of the tappet-wheel D' and pawl $n'$, a spring might be employed for returning the frame J and its pawl $n$ to the starting-position after each forward movement; but the supplementary tappet-wheel and pawl are preferred, as the movement imparted thereby is definite.

One of the prominent advantages of the use of a tappet-wheel for operating the actuating pawl $n$ is that said pawl is not operated when the tappet-wheel is turned backward, so that in backing the machine the dropping operation is discontinued, and there is no liability of depositing corn where it is not desired.

The cut-off plate $t$ is similar to those ordinarily employed, and serves to prevent the passage beneath the plate of any grains of corn other than those contained in the openings $k$ of the dropping-plate, the cut-off plate being at liberty to yield slightly, however, under the influence of the spring $t^2$, in order to permit the passage of grains of corn somewhat thicker than the dropping-plate.

The spaces between the grains of corn deposited in the row may be varied by varying the diameter of the tappet-wheels and the number of tappets carried thereby, or by varying the diameter of the traction-wheel B, or both, no change in the dropping-plate or pawl-carrying frame J being required.

The connection between the frame A and the beam of the plow is capable of vertical adjustment in order to accommodate said frame to wheels B of different diameters.

It will be noticed, on reference to Fig. 7, that the pawl $n$ has a central hub or enlargement for the reception of the pivot-pin, so that the sides of said pawl are kept free from contact with the walls of the slot in the arm $m$, and the accumulation of rust or dirt upon the pawl is thereby prevented, from interfering with the free tilting of the pawl on its pivot-pin. The same construction is preferably adopted in the pawl $n'$.

I claim as my invention—

1. The combination, in a corn-planter, of the dropping-plate M, having an annular rack, $p$, with an arm, $m$, pivoted concentrically with said dropping-plate, and having a pawl, $n$, adapted to act upon the teeth of the rack $p$, as set forth.

2. The combination, in a corn-planter, of the dropping-plate M, having an annular rack, $p$, the arm $m$, and its pawl $n$, adapted to act on the rack, and the rotating tappet-wheel D, whereby the arm $m$ and its pawl are actuated, as set forth.

3. The combination, in a corn-planter, of the dropping-plate M, having an annular rack, $p$, the concentrically-pivoted frame J, having arms $m$ $m'$, with plate-actuating pawl $n$ and retracting-pawl $n'$, and the two tappet-wheels D D', the wheel D acting upon the pawl $n$, and the wheel D' acting upon the pawl $n'$, as set forth.

4. The combination, in a corn planter, of the dropping-plate M, having an annular rack, $p$, the frame J, with its pawl or pawls, the shaft $e$, with its tappet wheel or wheels, and right-angled crank-pins $e'$, the traction-wheel B, having an axle, $f$, with right-angled crank-pins $f'$, and the connecting-rods $e^2$, as set forth.

5. The combination, in a corn-planter, of the furrowing-plow, the corn-planting devices in the rear of the same, the coverers, and the traction driving-wheel B, having a concave periphery, and opposite toothed or notched flanges, $c\,c$, one on each side of the row, as set forth.

6. The combination, in a corn-planter, of the dropping-plate M, having an annular rack, pawls for acting thereon, the grain-spout H, the cover-plate N, and a frictional retainer, $y$, interposed between the dropping-plate and the cover-plate, whereby the movement of said dropping-plate is retarded, as set forth.

7. The combination of the arm $m$ of the pawl-frame J, having a slot therein, with the pawl $n$, having an enlarged hub, whereby the sides of the pawl are kept free from contact with the inner walls of the recess, and the sticking of the pawl is prevented, as set forth.

8. The combination of the annular plate G, having a sunken cross-piece, $g$, with vertical stem $g'$, the standard A', the shaft $e$, with its tappet wheel or wheels, the pawl-carrying frame, the dropping-plate and the coverer-plate, as set forth.

9. The combination of the bars A, the grain-spout H, fitted between the same, and having lugs $q$, and the annular plate G, bearing on the top of the said spout H, as set forth.

10. The combination of the landside $b^3$, the subsoil-plow $b$ and its shank $b'$, the plate $b^2$, with its shoulder $b^5$, and the securing-bolt $b^4$, as set forth.

11. The combination of the coverers C, the handle-bars $a^3$, the mold-boards $a^2$, the filling-blocks C', placed above the handles and between the coverer-shanks and the mold-boards, and securing-bolts passing through the coverer-shanks, filling-blocks, and mold-boards, as set forth.

In testimony whereof I have signed my name to this specification in the presence of two subscribing witnesses.

PHILLIP HIEN.

Witnesses:
HARRY DRURY,
HARRY SMITH.